Jan. 16, 1934.  C. E. HARTMAN  1,943,668

TOOL GUIDE FOR DENTISTS' CONTRA-ANGLES

Filed July 10, 1931

Inventor
Carl Eugene Hartman
By Rolland S. Trott
Attorney

Patented Jan. 16, 1934

1,943,668

UNITED STATES PATENT OFFICE 1,943,668

TOOL GUIDE FOR DENTISTS' CONTRA-ANGLES

Carl Eugene Hartman, Denver, Colo.

Application July 10, 1931. Serial No. 549,834

6 Claims. (Cl. 32—10)

My invention relates to dental cutting tools and more especially to a tool guide for a dental contra-angle, or tool holder.

When a plate or bridge is to be anchored upon a tooth, one construction which may be used is what is known as a Carmichael; that is, the tooth to be used as the anchor tooth must have one or more grooves cut in it in order to properly and securely mount the plate or bridge connection.

In cutting this groove a drill, emery wheel or other cutting tool is mounted in a proper tool holder, generally in what is called a contra-angle.

In the work of cutting this groove, which should be accurately done if the work is to be high class, it is difficult for the dentist to steady the cutting tool so that the groove will be cut of the proper proportions and alignment, and it is also difficult to prevent the tool from now and then slipping off the tooth with the chance of injuring the gums of the patient or of at least causing some pain or discomfort.

It is therefore the object of this invention to provide a tool guide for use with the contra-angle or other tool holder, in cutting the mountings grooves in teeth used as anchors.

A further object of this invention is to provide such a tool guide for use with the contra-angle or other tool holder, which may be easily and quickly attached to and detached from the tool holder.

A further object is to provide such a tool guide for use with a contra-angle or other tool holder, which may be quickly and easily adjusted to fit any size and conformation of tooth, and the adjustment locked as set.

A further object is to provide a tool guide for a dental tool holder, which at the option of the dentist may either be left to swivel freely about the axis of the tool or may be swiveled to any desired position about the axis of the tool and there locked in place.

In this invention the above objects are accomplished by providing a swivel base adapted to fit and swivel upon the hub of a contra-angle or tool holder and to be held thereon by the usual hub nut, the base also being provided with a locking screw to lock it upon the hub in any swivel position, and by providing a guide piece slidably mounted upon the swivel base, and having screws to lock it in place at any point of its slide along said base.

This will all be fully described hereinafter and illustrated in the drawing, in which:—

Figure 1:
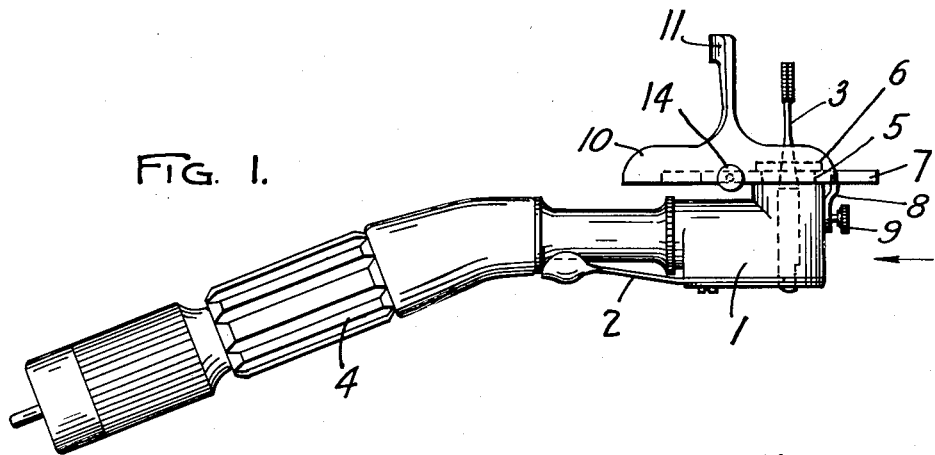
Figure 1 is an enlarged view of a dentist's contra-angle, a tool mounted therein, and my tool guide mounted upon the contra-angle hub.
Figure 2:
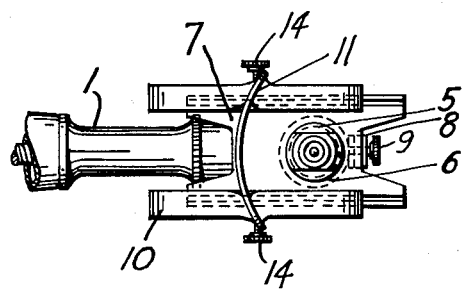
Figure 2 is a view looking down upon Figure 1.
Figure 3:
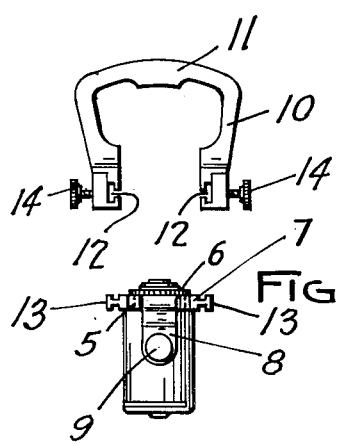
Figure 3 is a view looking at Figure 1 in the direction of the arrow but with the tool, and the handle of the contra-angle removed, and the guide piece being detached from and appearing directly above the swivel base upon which it is normally mounted.

The contra-angle 1 is provided with the usual tool latch 2, which holds the tool 3 in place. Any other tool locking means may be employed so long as it acts to lock the tool in the tool holder.

The contra-angle is also provided with the handle 4, the hub 5, and the hub nut 6. Any other tool holder than a contra-angle may be used to mount my tool guide so long as it is provided with a hub upon which the swivel base 7 of my guide may be properly mounted.

The swivel base 7 has an aperture to receive the hub 5 of the contra-angle, the nut 6 being screwed in place after the swivel base is mounted thereon and acts to hold the swivel base on the hub while still permitting it to rotate thereon.

The swivel base 7 has the tongue 8, through which is threaded the locking screw 9. When it is desired to hold the swivel base in one position on the contra-angle, thus locking the swivel base in the position set, the screw 9 is screwed inward against the contra-angle.

The guide piece 10 is provided with the curved guide rib 11 which is adapted to bear against the tooth in which the groove is being cut by the tool 3.

Any other proper tool besides the drill 3 shown may be used at the option of the dentist.

The guide piece 10 is also provided with the grooves 12 into which the tongues 13 of the swivel base 7 have a close sliding fit. The guide piece 10 is also provided with the locking screws 14.

Figure 6:
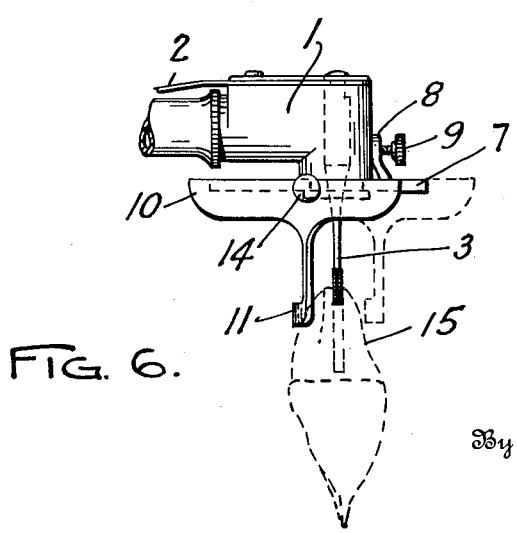
Figure 6 is a view of my guide upon a contra-angle equipped with a tool, indicating just how it would be used in cutting a groove in a tooth.

The guide piece 10 may be moved along the tongues 13 of the swivel base 7 to the position where the rib 11 will make the proper support and guide for the tool 3 by contact with the tooth as shown at 15, in Figure 6. The guide piece 10 may then be locked in the position set by the locking screws 14.

When the groove is finished at the point for which the guide has been set, a new setting of the guide may be made to guide the tool while another part of the groove is being cut.

As can be seen in Figure 6, the guide setting will have to be changed probably several times as the groove approaches the gums and the groove indicated is finished.

That is, since the tooth as shown is thicker near the gums, the guide will have to be set farther from the tool as the tool approaches the gums so that the groove will be cut straight.

Whether the swivel base 7 will be left free to swivel on the hub 5 or be locked in one position by the locking screw 9 will depend upon the nature of the tooth and the size, nature, position and direction of the groove the dentist desires to make in the tooth, as well as depending upon the individual taste and judgment of the dentist.

Figure 4:
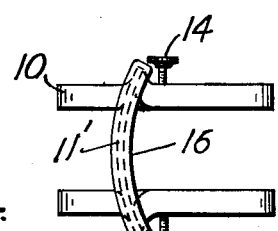
Figure 4 is a view looking down upon a modified form of guide piece.
Figure 5:
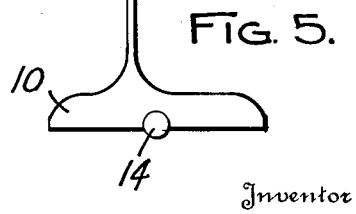
Figure 5 is a side elevation of Figure 4.

In the modified form of guide ribs shown at 11' in Figures 4 and 5 the rib 11' is covered by the covering 16 which may be made of rubber or some other non-metallic material, which is adapted to rest against the patient's gums and thereby support and guide the tool. The height of the rib 11' from the swivel base 7 is made enough greater for this purpose.

For some work, and for some teeth, some dentists may prefer the guide upon the gums; but in any case the general result is the same in that the device acts to guide the tool so that accurate, convenient, certain and comfortable cutting of grooves is possible. Naturally, if desired, the guide piece may be slid upon the tongues or guides of the swivel base so that the rib will then bear upon the other side of the tooth as indicated by the dotted line position shown in Figure 6; that is, the guide piece may be moved along till the outside of the curve of the rib bears against the other side of the tooth.

It will thus be seen that by swiveling the swivel base upon the hub 5, or by sliding the guide piece along the tongues or guides of the swivel base, a dentist will be able to adjust the guide to conveniently and comfortably and steadily guide the tool 3 for substantially any work at all that is required to be done, whichever form of guide rib is employed.

Having now described my invention, what I claim as new, and desire to protect by Letters Patent, is as follows:—

1. In a tool guide for a dental cutting tool held in a tool holder, an elongated, yoke-shaped guide having its guide surface extending at right angles to the tool and adapted to be carried by the tool holder and to contact and slide along the tooth being worked upon by the tool and thereby guide said tool, and means mounting the said guide upon the tool holder and spacing it from the adjacent side of the said tool.

2. In a tool guide for a dental cutting tool held in a tool holder, a guide having a horizontally elongated sliding contact surface extending at right angles to the tool and facing said tool and adapted to be carried by the tool holder and to contact and slide along the tooth being worked upon by the tool and thereby guide said tool, a nut concentric with said tool and means held to said tool holder by said nut and mounting the said guide upon the tool holder spaced from the adjacent side of said tool.

3. In a tool guide for a dental cutting tool held in a tool holder, a hub having parallel guide tongues mounted upon the tool holder concentric with the tool, a nut concentric with said tool securing the hub to the tool holder, a guide extending at right angles to the tool and adapted to contact and slide along the tooth being worked upon by the tool and thereby guide said tool and means mounting the guide to slide along the tongues of said hub whereby the spacing of the guide from said tool may be varied.

4. In a tool guide for a dental cutting tool held in a tool holder, a hub having parallel tongues swiveled upon the tool holder concentric with the tool, means to secure the hub upon the tool holder, means to lock the hub and prevent its swiveling upon the tool holder, a guide extending at right angles to the tool and adapted to contact and slide along the tooth being worked upon by the tool and thereby guide said tool, means slidably mounting the guide upon the tongues of said hub and means to lock the said guide with respect to said hub whereby its radial position from said tool may be set.

5. In a tool guide for a dental cutting tool held in a tool holder, a guide having a horizontally elongated sliding contact surface extending at right angles to the tool and facing said tool and adapted to contact and slide along the tooth being worked upon by the tool and thereby guide said tool and means mounting the said guide upon said tool holder laterally spaced from said tool.

6. In a tool guide for a dental cutting tool held in a tool holder, a guide having a horizontally elongated sliding contact surface extending at right angles to the tool and facing the tool, and adapted to be carried by the tool holder and thereby guide said tool, and means mounting the said guide upon the tool holder and spacing it from the adjacent side of the tool sufficient to permit part of a tooth to be intermediate the sliding contact guide and the tool.

CARL EUGENE HARTMAN.